United States Patent [19]

Mort et al.

[11] 4,149,061
[45] Apr. 10, 1979

[54] APPARATUS FOR CONTINUOUSLY CLADDING A DISHED SURFACE

[75] Inventors: David Mort, Monroeville, Pa.; Ben B. Hood, Valrico, Fla.

[73] Assignee: Westinghouse Electric Corp., Pittsburgh, Pa.

[21] Appl. No.: 847,864

[22] Filed: Nov. 2, 1977

[51] Int. Cl.² .............................................. B23K 9/04
[52] U.S. Cl. ........................... 219/76.14; 219/124.02; 219/124.22; 219/124.33; 219/125.11; 219/159
[58] Field of Search ................ 219/125.1, 125.11, 159, 219/76.14, 124.02, 124.33, 124.22

[56] References Cited

U.S. PATENT DOCUMENTS

| 2,283,140 | 5/1942 | Johnston | 219/159 |
| 3,627,973 | 12/1971 | Smith | 219/76.14 X |
| 3,795,785 | 11/1972 | Smith | 219/76.14 X |

*Primary Examiner*—E. A. Goldberg
*Attorney, Agent, or Firm*—F. J. Baehr, Jr.

[57] ABSTRACT

Apparatus which rotates and tilts a dished surface and moves a welding head in unison therewith to continuously deposit weld metal at the bottom dead center of the dished surface to clad the surface.

13 Claims, 7 Drawing Figures

APPARATUS FOR CONTINUOUSLY CLADDING A DISHED SURFACE

BACKGROUND OF THE INVENTION

This invention relates to apparatus for continuously depositing weld metal on a dished surface and more particularly to cladding the inside surface of heads for pressure vessels.

It is economical to form heads for large pressure vessels of carbon steel and then coat or clad the surfaces with stainless steel or other corrosion resistant materials in order to meet the requirements of the nuclear power or chemical industry. Large, high pressure, pressure vessels require thick heads that cannot be economically produced solely from corrosion resistant materials so that coating the surfaces with a corrosion resistant material or cladding them is the only economical method of producing such equipment. The cladding must be free of defects and continuous so as not to produce stress concentrations or areas where corrosion can attack the base metal.

Explosive techniques have been utilized to metallurgically bond sheets of corrosion resistant material to the dish-shaped heads. However, the bond between the base metal and the protective sheet is difficult to perfect as it must stand up to repeated temperature and pressure cycling. Cladding utilizing welding techniques has been utilized successfully; however, the cladding has been deposited by forming a series of concentric rings. The operator stops the welding process and restarts it to form each new ring. The setup time between rings is relatively large, thus reducing machine utilization time. The machines are large and expensive, therefore, improving their utilization efficiency is financially beneficial.

SUMMARY OF THE INVENTION

In general, apparatus for continually cladding a dished surface, when made in accordance with this invention, comprises a pedestal, a turntable rotatably and pivotally mounted on the pedestal, a device for rotating the turntable at varying angular velocities and a device for tilting the turntable generally through at least 90°. The apparatus also comprises a welding manipulator pivotally mounted on the turntable base and connected thereto by a parallel bar 4-bar linkage. The welding manipulator has a base portion, a boom pivotally mounted to the base and an upright member slidably connected to the boom and depending therefrom. A welding head is cooperatively associated with the upright member. The parallel bar 4-bar linkage cooperates with the pedestal, the turntable and the base of the manipulator to keep the base of the manipulator generally horizontal as the turntable tilts. The welding manipulator further comprises a drive for moving the upright generally vertically, a drive for swinging the boom about its pivotal axis, and drives for moving the welding head horizontally in two directions at right angles to each other. The apparatus further comprises sensors responsive to the tilt angle of the turntable to position the weld head generally above a bottom dead center position of the dish and sensors responsive to the tilt of the turntable to vary the angular speed of the turntable to provide a generally constant linear speed of the dished surface relative to the weld head and a control which is capable of responding to each revolution of the turntable to change the tilt angle thereof a predetermined amount depending on the shape of the dished surface and the previous angle at which the turntable was tilted, whereby cladding is disposed on the dished surface by the weld head in successively disposed connected angular rings to continuously clad the dished surface except for a relatively small portion adjacent the center thereof.

BRIEF DESCRIPTION OF THE DRAWINGS

The objects and advantages of this invention will become more apparent from reading the following detail description in connection with the accompanying drawings in which corresponding reference numerals indicate corresponding parts and in which.

DESCRIPTION OF THE PREFERRED EMBODIMENT

Figure 1:
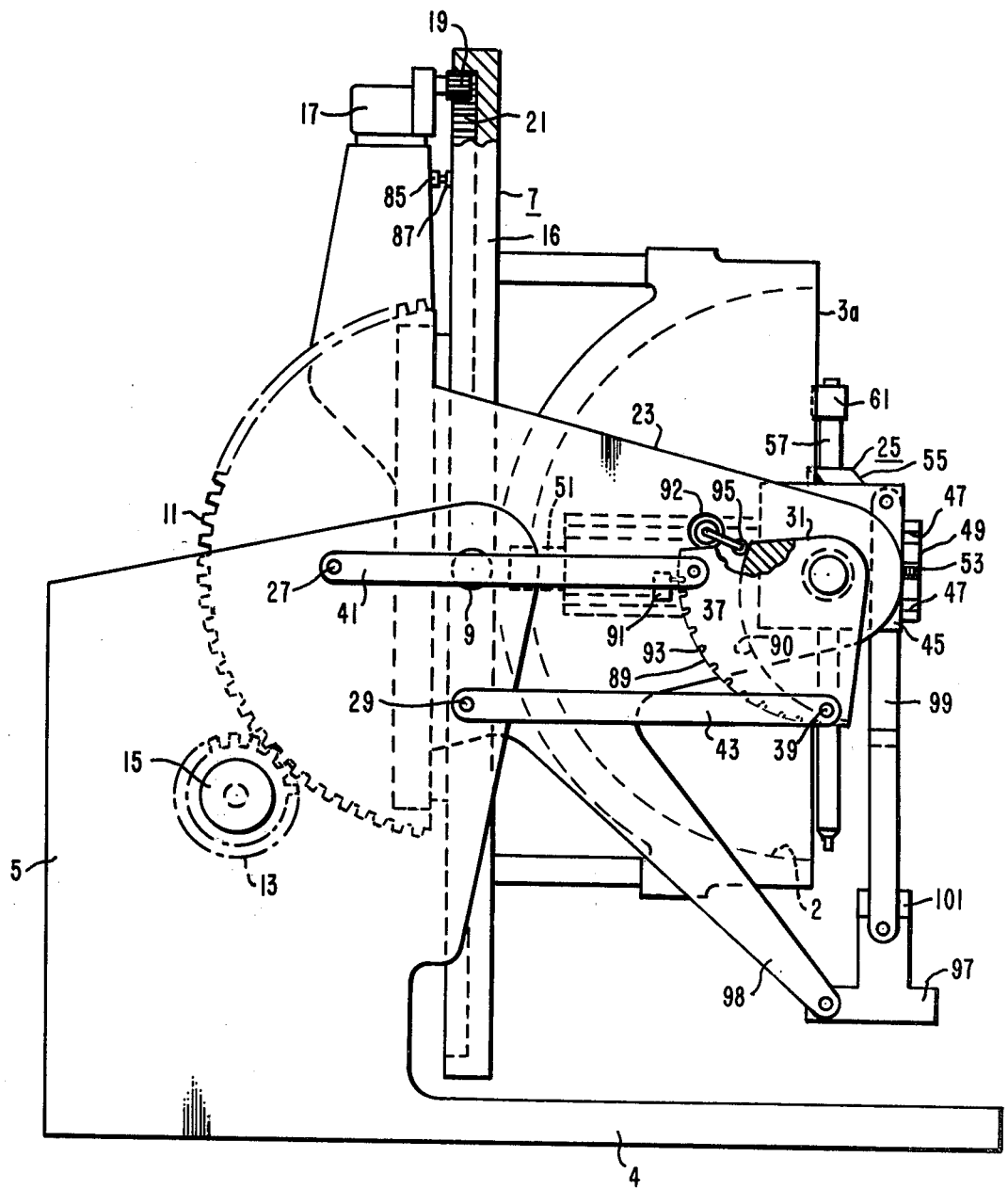
FIG. 1 is a side elevational view of cladding apparatus made in accordance with this invention.
Figure 2:
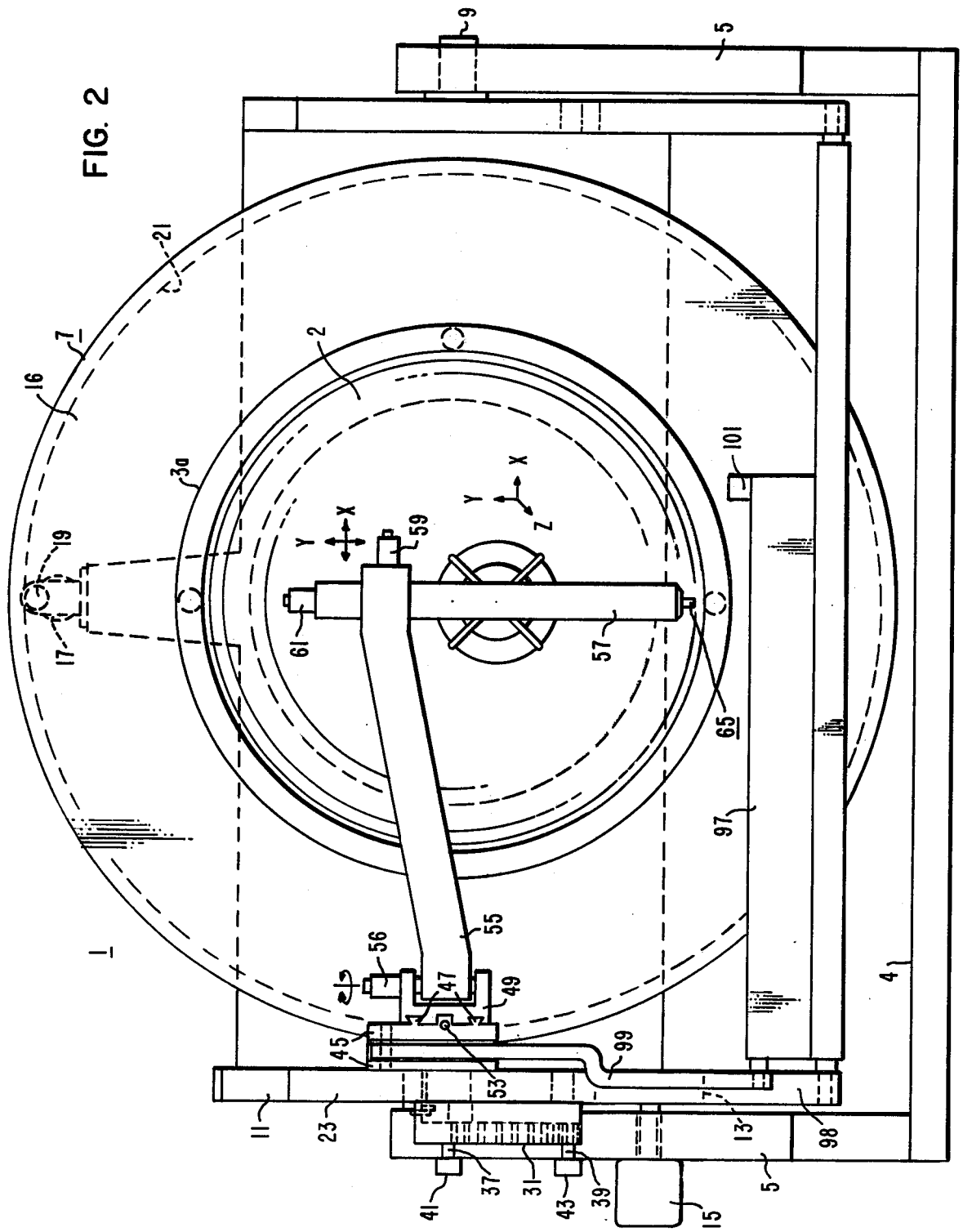
FIG. 2 is a front elevational view of the cladding apparatus.
Figure 3:
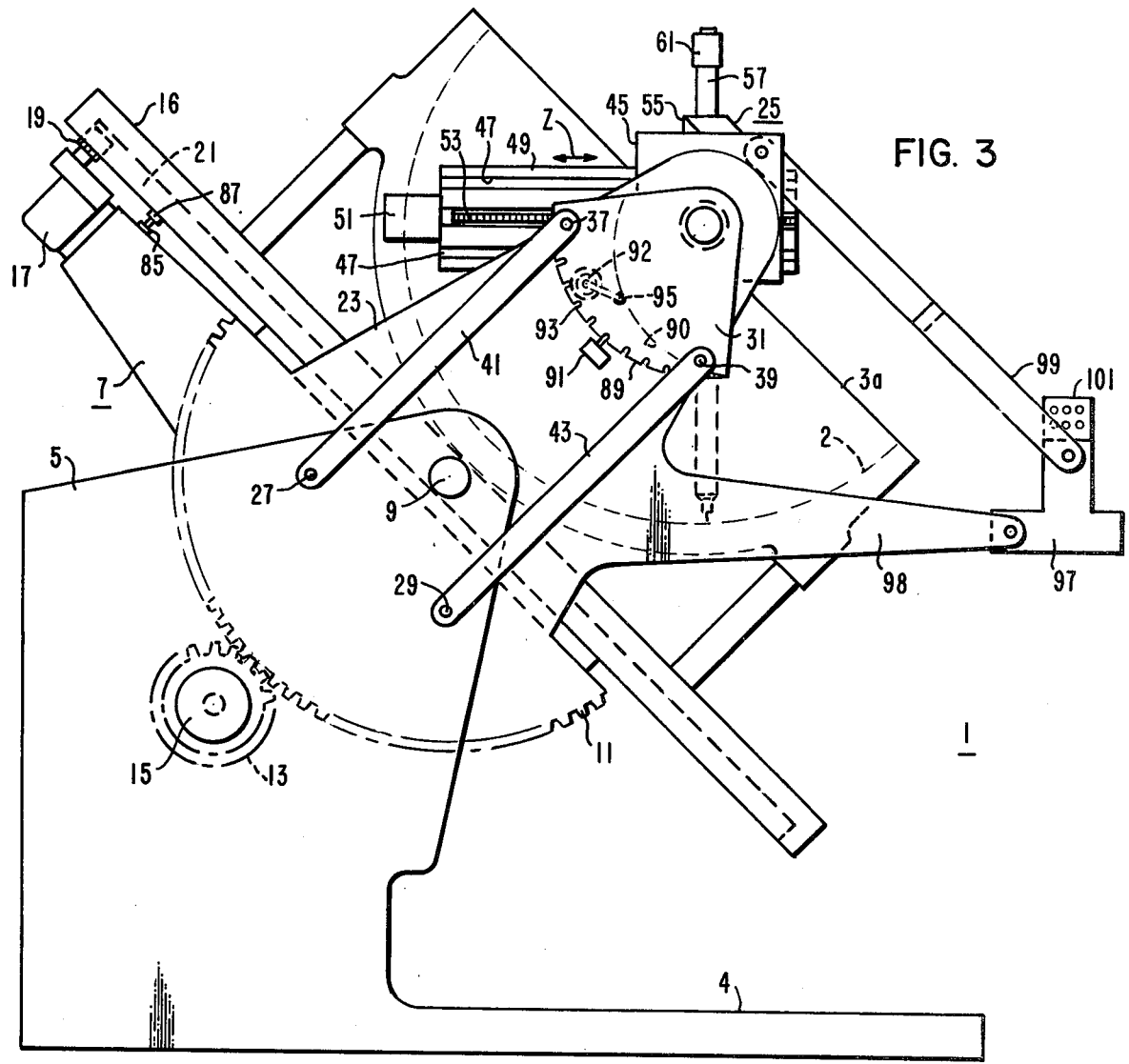
FIG. 3 is a side elevational view of the cladding apparatus operating on a hemispherical head.

Referring now to the drawings, in detail and in particular to FIGS. 1-3, there is shown an apparatus 1 for continuously cladding a dished surface 2 such as the interior of a head 3a of a pressure vessel. While the preferred embodiment shows internal dished surfaces for which the apparatus is primarily intended, the apparatus will also clad external dished surfaces, flat surfaces, or even the outer surface of a cylinder. The dish shapes normally utilized for heads of pressure vessels takes the form of hemispherical heads 3a, ellipsoidal or elliptical heads 3b or torrispherical or flanged and dished heads 3c. Hemispherical heads 3a as shown in FIGS. 1-3 have the simplest geometry and it is easier to understand the requirements for producing a continuous cladding thereon, however, all of the heads mentioned are commonly utilized in the manufacture of pressure vessels so that the apparatus must be adapted to continuously apply cladding to any of the surfaces in order to be economical.

Apparatus 1 to continuously apply cladding to the dished surface 2 of the heads 3a, b, c, comprises a pedestal 4 fixed to a foundation (not shown). The pedestal 4 is generally U-shaped and has two legs 5 which extend generally vertically and upwardly. A turntable assembly 7 is pivotally mounted on the pedestal 4 by trunnions 9, which are rotatably disposed in bearing surfaces within the legs 5. Affixed to the turntable assembly 7 is a segment of a gear 11 disposed generally parallel to and adjacent one of the legs 5. The axis of the gear 11 is disposed coaxially with the trunnions 9. A pinion 13 is disposed to engage the gear segment 11 and is directly connected to a reversible motor 15 or other drive means, which rotate the pinion 13 and gear segment 11 to tilt the turntable assembly 7 to any desirable position from a vertical to a generally horizontal position. The turntable base 7 shown tilts approximately 180°; however, for this invention it is required that the turntable assembly 7 tilt approximately 90°.

A turntable 16 is rotatably disposed about a central axis on the turntable assembly 7. A gear reduced variable speed motor 17 driving a pinion 19 and ring gear 21 is disposed on the turntable base 7 to rotate the turntable 16 about its central axis in this embodiment, however, other drive means well known in the art may be utilized. Being a variable speed motor, it is capable of varying the angular velocity of the turntable 16 to produce generally constant linear speed of the dished surface relative to a generally fixed position for welding.

An arm 23 extends upwardly from the turntable assembly 7 and a welding manipulator 25 is pivotally mounted on the arm 23. The welding manipulator 25 is also connected to the pedestal 4 by a parallel bar 4-bar linkage or other means such as a chain or gear arrangement for maintaining the welding head in a generally vertical or fixed orientation as the turntable assembly 7 tilts. The parallel bar 4-bar linkage consists of two sets of parallel bars, each set consisting of two bars of identical length. The first set of bars consists of a portion of the pedestal 4 disposed between two pivot points 27 and 29 and constitutes a fixed bar of the linkage. The other bar in the first set consists of a portion of a cam 31 disposed between the points 37 and 39. The cam 31 is affixed to the manipulator 25 and pivotally mounted on the arm 23. A line between the points 37 and 39 will always remain parallel to a line between the points 27 and 29, which are fixed. The second set of bars consists of bars 41 and 43 which are pivotally connected adjacent their ends to the points 27 and 37 and 29 and 39, respectively.

The welding manipulator 25 comprises a base portion 45 affixed to the cam 31 and pivotally disposed with respect to the arm 23. Because of the cooperation of the bars of the parallel bar 4-bar linkage and the pivotal connection of the base 45 to the arm 23, horizontal and vertical surfaces on the base 45 remain generally horizontal and vertical as the turntable assembly 7 tilts as shown in FIGS. 1 and 3. Slidably connected to the base 45 by dovetail grooves 47 or other means for producing rectilinear motion therebetween, is a horizontal slide portion 49. A reversible motor 51 and screw 53 are cooperatively associated with the horizontal slide 49 to move the horizontal slide portion 49 horizontally with respect to the base 45. A boom 55 is pivotally mounted on a vertical axis on the horizontal slide portion 49. A reversible motor 56 or other drive means swings the boom about its vertical axis. An upright member 57 is slidably connected to the distal end of the boom 55. A horizontal drive motor and slide 59 or other drive means moves the upright horizontal with respect to the boom 55 or in the X direction, and a vertical drive motor and slide 61 or other drive means moves the upright member 57 vertically with respect to the boom 55 or in the Y direction. The motor 51 and screw 53 move the horizontal slide 49 in the Z direction to provide X, Y and Z movement of the upright 57. A welding head 65 is disposed on the lower end of the upright 57. The various members forming the manipulator 25 are representative of the cooperative association of members necessary to provide motion in X, Y and Z directions to the welding head 65, to allow the welding head 65 and boom 55 to swing out of the way for loading and unloading the turntable assembly 7, and for filler wire reloading. The motion in any direction may be provided by a plurality of drives, particularly where it is desirable to provide a long stroke at high speed and a short accurate adjustment in the same direction. Such drives are well known in the art and it is understood that they may be utilized to provide such movements in any desired combination.

Figure 6:
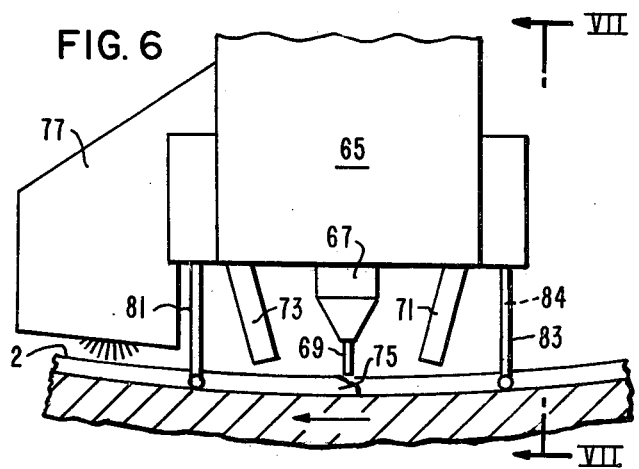
FIG. 6 is a partial sectional view of a welding head and probes utilized in this invention.
Figure 7:
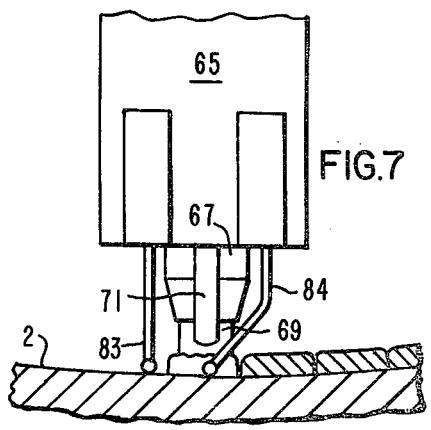
FIG. 7 is a partial sectional view taken on lines VII—VII of FIG. 6.

In FIGS. 6 and 7 the welding head 65 is shown with a submerged arc welding apparatus incorporated therein and comprises a strip feed 69, which feeds a strip or ribbon of filler metal to the arc. A flux supply nozzle 71 and a flux recovery nozzle 73 are cooperatively associated with the weld head 65 for producing a wide weld bead 75. A wire wheel or other means 77 for breaking up fused flux and removing the broken flux is also disposed on the welding head and cooperates therewith to produce the continuous weld bead 75.

A plurality of probes 81, 83 and 84 are disposed on the welding head 65 and cooperate with the drive means 51, 59 and 61 to maintain the arc generally at the bottom dead center of the dished surface 2. At least one of the probes maintains the proper distance between the weld head and the dished surface to maintain the arc by signaling the vertical drive motor 61 to move the welding head 65 in the Y direction. A combination of probes can also be utilized to make X and Z directional changes to compensate for variations in the dished surface to move the arc over the bottom dead center of the dished surface. The use of such probes is well known in the art.

A microswitch 85 or other means cooperates with a finger 87 on the turntable 16 to signal each time the turntable 16 makes one revolution.

The cam 31 has a plurality of surfaces 89 and 90 which cooperate with a microswitch or other suitable means 91 and a potentiometer 92, respectively, to produce signals representative of the angular tilt as well as rotation of the turntable 16. The cam surface 89 is made up of a plurality of notches or pegs 93 or other suitable means which activate the microswitch 91 to indicate that the turntable has traversed a predetermined arc. By varying the spacing between the notches or pegs 93, the cam 31 can be made to vary the arcuate movements of the turntable 16 a different amount after each revolution of the turntable 16 to accommodate any dish geometry. The cam surface 90 is a continuous or smooth surface and it cooperates with a cam follower 95 and potentiometer 92 to indicate the tilt position of the turntable 16. These devices are representative and are generally interchangeable and other devices known in the art could be utilized to replace them. Signals initiated from the cam surfaces 89 and 90 control the tilt motor 15, the angular speed of the turntable 16 by controlling the speed of motor 17, the position of the horizontal slide 49 to position the weld head in the Z direction and they may be utilized to vertically position the upright 57. The probes 81, 83, and 84 may also be utilized for this function and at least one of them would provide feedback for maintaining the proper distance between the weld head 65 and the dished surface 2.

The apparatus 1 is utilized to clad heads 3a, b or c up to approximately 20 feet in diameter so that a work platform 97 is disposed adjacent the outer periphery of the dished surface 2 to allow continuous inspection of the fused flux and cladding, and to facilitate servicing the weld head 65, which must be supplied with welding strip and flux. The work platform 97 is pivotally connected to the manipulator base 45 by a parallel bar 4-bar linkage. The base of the manipulator 45 serves as one link and the platform 97 serves as the link parallel with the base 45. The arm 23 has a branch 98 extending outwardly therefrom and the arm 23 and branch 98 serve as another link and a link 99 pivotally connected at its ends to the base 45 and the platform 97 serves as the link parallel to the other link. This parallel bar 4-bar linkage maintains the work platform in a generally horizontal position as the turntable assembly 7 moves from its generally horizontal to vertical position locating an operator adjacent the periphery of the dish-shaped surface so that he may constantly inspect the welding operation. Manual controls 101 are available for the operator to manually control the apparatus and override the automatic controls and are disposed on the work platform within the operator's reach.

As shown in FIGS. 1, 2, and 3, the head 3a having a hemispherical surface is placed on the turntable assembly 7 so that it is centrally located on the turntable 16 and the flange face of the dished surface is generally parallel to the turntable 16. The center of the major radius of the head 3a is disposed on the central axis of the turntable 16 adjacent a horizontal line extending from the axis about which the manipulator 25 is pivotally disposed.

Figure 4:
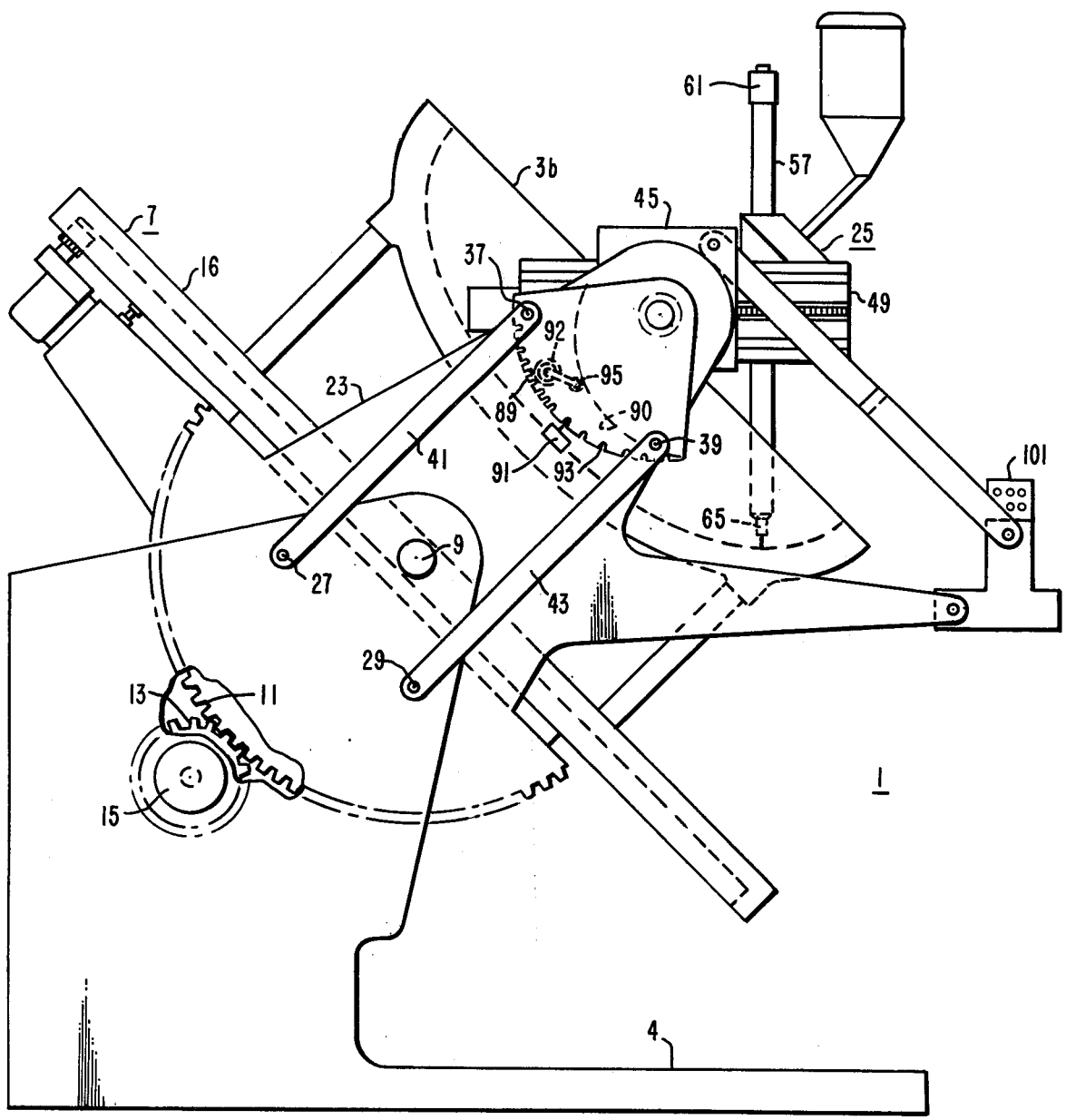
FIG. 4 is a side elevational view of the cladding apparatus operating on an elliptical head.
Figure 5:
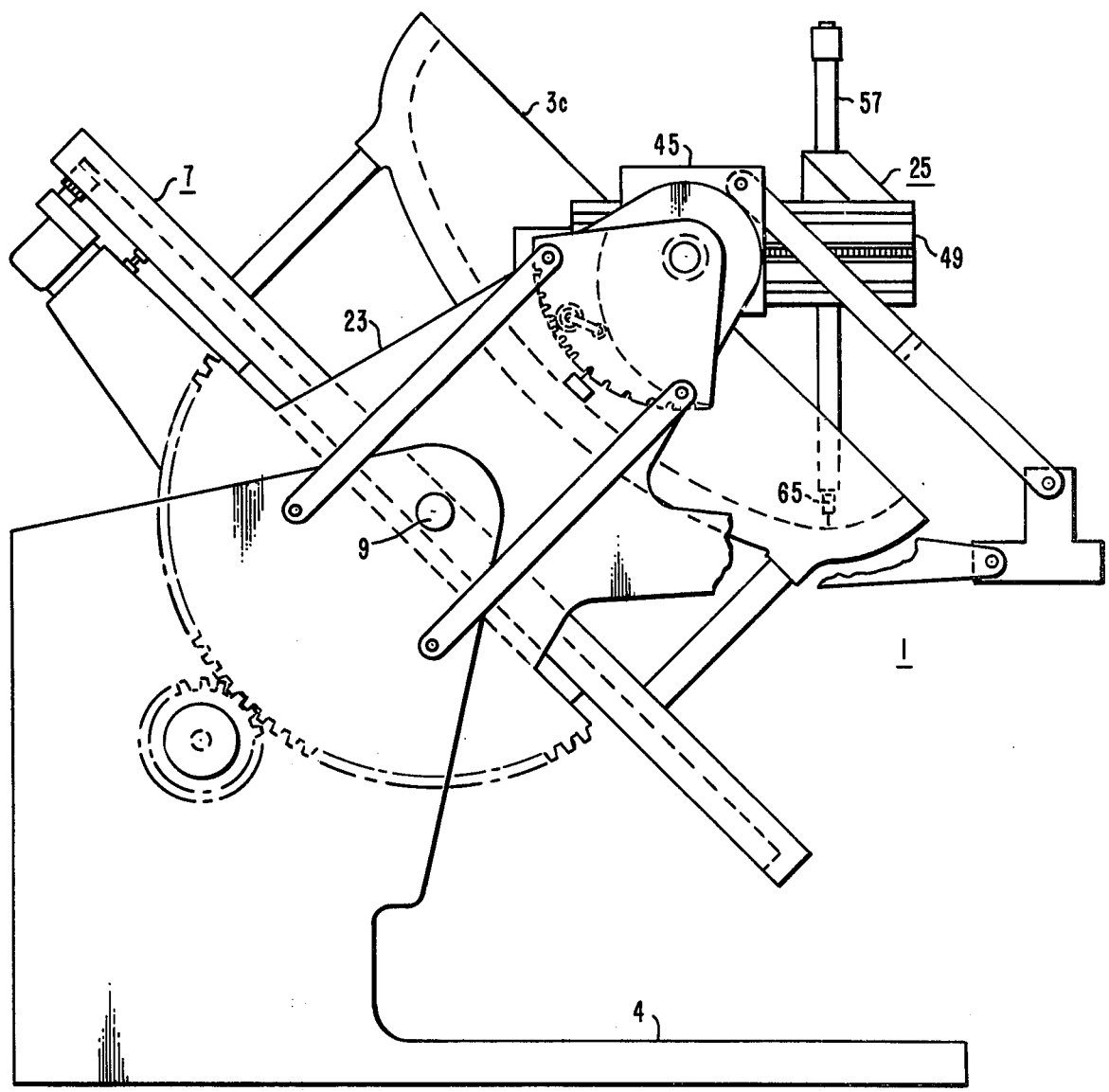
FIG. 5 is a side elevational view of the cladding apparatus operating on a torrispherical head.

FIGS. 3, 4 and 5 show the turntable 16 disposed at the same angle of tilt; however, the weld head 65 is displaced to position it generally above a bottom dead center position on the dished surface, which is important to provide high quality cladding.

To form continuous cladding strips the cladding must be laid down in a spiral path or in a series of rings with an angular transition between adjacent rings. If the dish surfaces were all hemispherical, a spiral path would be simple requiring a fixed ratio between table rpm and tilt rpm and constantly varying table speed in order to produce a constant linear welding speed. With shapes other than spherical, the ratio of turntable 16 rpm to tilt rpm would vary, and depending upon the position of the weld head 65 with respect to the surface the welding head must continuously change its position to maintain its programmed position with respect to the surface. To provide an optional, more conventional cladding pattern, the cladding is laid down in adjacent rings with an angular transition between adjacent rings. Upon each revolution of the turntable 16 the microswitch 85 energizes the tilt motor 15, which runs until the microswitch 91 adjacent the cam surface 89 indicates that the turntable assembly 7 has tilted the proper predetermined angle to form the next ring. The rate at which the tilting motor operates governs on the length and angle of the transition strip. The cam surface 90 operates the potentiometer 92 to control the motor 17 to vary the angular velocity of the turntable 16 to produce a generally constant linear velocity of the dished surface relative to the weld head 65. Once the operation has begun the manipulator 25 will continuously and automatically move the weld head 65 to produce a series of concentric rings with a short transition strip between the rings to form a continuous cladding over the majority of the dished surface. Due to the size of the turntable 16 and the heads 3a, b and c, a small area adjacent the center of the dished surface is not clad as the peripheral speeds of the turntable 16 would become excessively high as the weld head 65 approaches the center of the dish-shaped surface 2.

Elliptical and torrispherical heads 3b and 3c as shown in FIGS. 4 and 5, respectively, require that the weld head 65 move horizontally or in and out and vertically, up or down varying distances depending on the portion of the head being clad so that the arc is generally adjacent the bottom dead center of the elliptical or torrispherical-shaped surface at the point of cladding. In FIGS. 3, 4 and 5 the turntable assembly 7 is tilted at the same angle; however, the weld head 65 is disposed at a different Y and Z position. As the apparatus is operated and the weld head 65 advances from one ring to the adjacent ring, the incremental change in the angle of tilt varies in different portions of the dished surface, depending on the position of the weld head 65 relative to the surface so that the cam 89 must be shaped to provide for this difference. This can be done by placing the notches or pegs 93 at different intervals so that upon each revolution of the turntable 16 the tilt motor 15 will tilt the turntable assembly 7 the proper number of degrees. Simultaneously, the cam 90 responds to the angular position of the turntable assembly 7 to signal the turntable drive motor 17 to change its angular speed to maintain a generally constant linear speed of the dished surface relative to the weld head 65. One of the probes maintains a predetermined distance between the weld head 65 and the dished surface 2 to maintain a generally constant distance therebetween to sustain an arc. Probes 81 and 82 may cooperate to correct the position of the weld head 65 to maintain the weld head 65 generally above the bottom dead center position with respect to one plane while the probes 83 and 84 cooperate to correct the position of the weld head 65 to maintain the weld head generally above dead center with respect to a plane at right angles to the first mentioned plane.

The boom 55 swings outwardly over the work platform 97 to facilitate loading of weld metal in the form of coils of strip or ribbon on the upright member 57 and to facilitate installing and removing the head 3a, b and c from the turntable 16.

The apparatus 1 hereinbefore described advantageously provides for continuously cladding a dished surface by depositing weld metal at the bottom dead center of the dished surface 2 irrespective of the geometry of the dished surface 2, for maintaining a good vantage point for an operator to monitor the arc and the welding process, and for a rigid manipulator with a minimum amount of lost motion to produce high quality cladding on any shape dished surface.

What is claimed is:

1. Apparatus for continuously cladding a dished surface, said apparatus comprising:
    a pedestal,
    a turntable assembly pivotally mounted on said pedestal and having a turntable rotatably mounted thereon,
    first drive means for rotating said turntable at varying angular velocities,
    second drive means for tilting said turntable assembly at least generally 90°,
    a welding manipulator pivotally mounted on said turntable assembly,
    said welding manipulator having a base portion, a boom mounted on said base and a welding head disposed on the boom means for maintaining said welding head in a fixed orientation as said turntable assembly tilts,
    means for moving said welding head generally vertically,
    means for moving said welding head generally horizontally in two directions at right angles to each other,
    means for sensing the tilt angle of said turntable assembly, means responsive to said tilt angle to move said welding head adjacent a boom dead center position of said dished surface, means responsive to said tilt angle to vary the angular speed of said turntable to provide a generally constant linearly speed of a point on said dished surface relative to said welding head, and means responsive to one revolution of said turntable to change the tilt a predetermined amount depending on the shape of the dished surface and the previous angle at which the turntable was tilted, whereby cladding is deposited on the dished surface in circular rings forming generally continuous cladding over the entire dished surface except for a relatively small portion adjacent the center thereof.

2. Apparatus as set forth in claim 1 and further comprising a platform pivotally connected to the turntable assembly and pivotally connected to the base of the manipulator and means for maintaining the platform in generally horizontal position and adjacent the outer edge of the dished surface as the turntable assembly tilts.

3. Apparatus as set forth in claim 1, wherein the boom is slidably disposed with respect to the base of the manipulator.

4. Apparatus as set forth in claim 1 wherein the boom is pivotally disposed with respect to the base and swings at least 90 degrees.

5. Apparatus as set forth in claim 1 and further comprising means for sensing the distance between the welding head and the dished surface and for sending a signal to the means for moving the welding head vertically to maintain a generally fixed distance between the welding head and bottom dead center of the dished surface.

6. Apparatus as set forth in claim 1, wherein the means for sensing the tilt angle of the turntable assembly comprises a cam, a cam follower, and a potentiometer cooperatively associated with the cam and cam follower to produce an electrical signal proportional to the tilt angle of the turntable assembly.

7. Apparatus as set forth in claim 1 and further comprising a jig for locating the dished surface so that its axis is coaxial with the axis of rotation of the turntable.

8. Apparatus as set forth in claim 1 and further comprising a pair of probes adjacent the welding head, the probes being disposed to ride on the dished surface and produce a signal that moves the welding head horizontally to a point vertically above bottom dead center of the dished surface.

9. The apparatus as set forth in claim 1, wherein the dished surface comprises hemispherical, ellipsoidal and torrispherical surfaces.

10. Apparatus as set forth in claim 2, wherein the platform is a work platform and has controls thereon for overriding the automatic controls and for making minor adjustments to the location of the welding head with respect to the bottom dead center of the dished surface.

11. Apparatus as set forth in claim 1, wherein the means for maintaining the welding head in a fixed orientation as the turntable tilts is a parallel bar 4-bar linkage.

12. Apparatus as set forth in claim 2, wherein in the means for maintaining the platform in a generally horizontal position and adjacent to the outer edge of the dished surface is a parallel bar 4-bar linkage.

13. Apparatus as set forth in claim 1, wherein the means for sensing the tilt angle of the turntable assembly comprises a plurality of pegs spaced on an arcuate path and a microswitch which cooperate to produce a digital electrical signal that indicates the tilt position of the turntable assembly.

* * * * *